Feb. 26, 1952 C. B. LIVERS 2,587,182
HYDRAULIC MOTOR CYLINDER WITH STROKE-LIMITING VALVE
Filed June 19, 1950
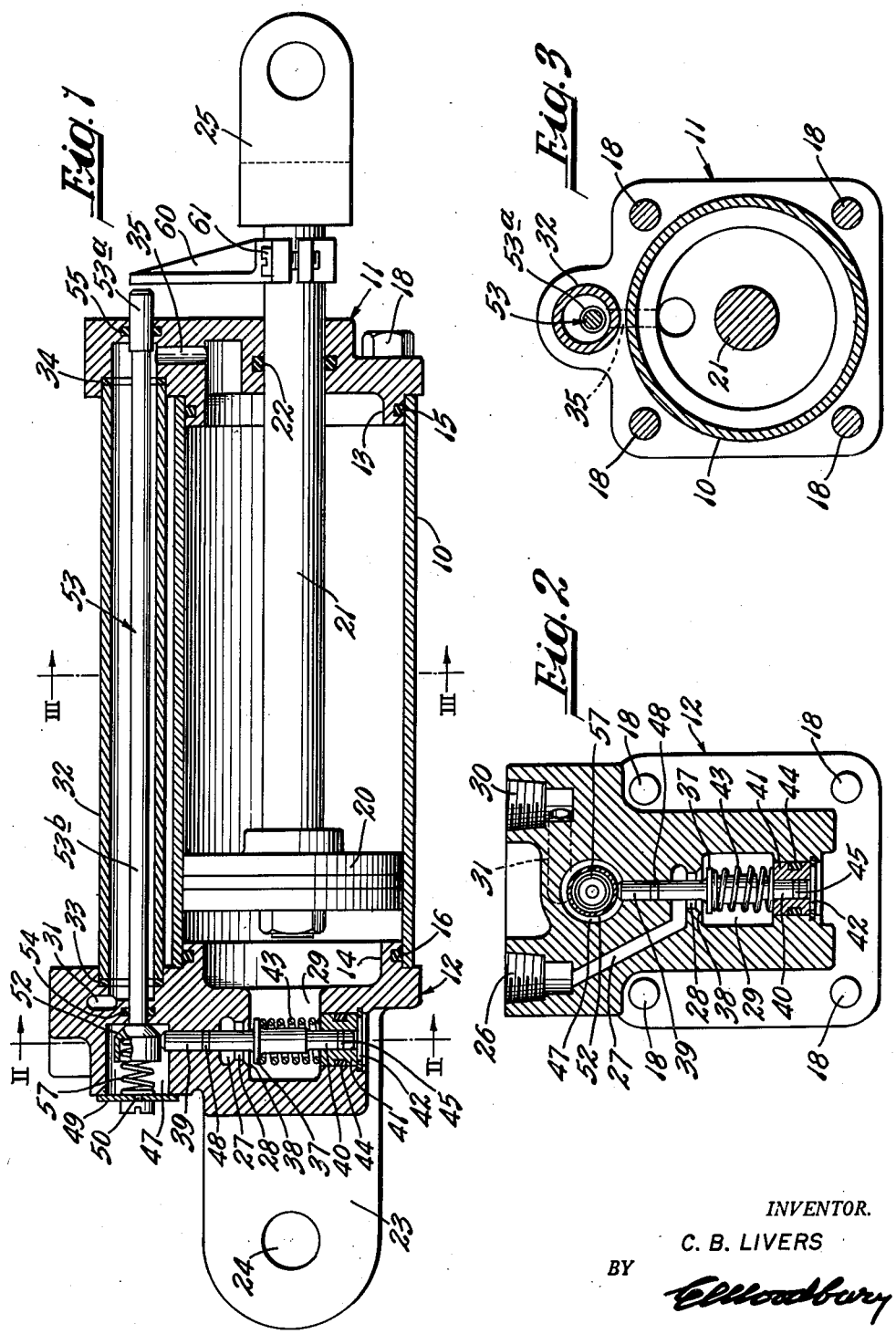
INVENTOR.
C. B. LIVERS
BY
*E. Woodbury*
ATTORNEY Patented Feb. 26, 1952

2,587,182

UNITED STATES PATENT OFFICE 2,587,182

HYDRAULIC MOTOR CYLINDER WITH STROKE LIMITING VALVE

Carlos B. Livers, North Hollywood, Calif., assignor to Bendix Aviation Corporation, South Bend, Ind., a corporation of Delaware Application June 19, 1950, Serial No. 168,913

7 Claims. (Cl. 121—38)

This invention relates to motor cylinders such as are used in hydraulic systems for raising and lowering earth-working elements of tractor-drawn implements. It is frequently desirable to preset such cylinders for movement through a definite stroke and cause them to automatically stop in a desired position without attention from the operator.

An object of the invention is to provide a unitary motor cylinder and stroke-limiting valve assembly in which the moving parts are substantially enclosed and protected from dirt and from mechanical injury.

Another object is to provide an assembly of this type in which the external fluid connections are both made at the same end of the cylinder.

Another object is to provide a motor cylinder with automatic stroke-limiting valve action that is reliable and is not subject to damage or to being thrown out of adjustment by failure to stop at the intended position.

Other more specific objects and features of the invention will become apparent from the following description, with reference to the drawing, in which:

Fig. 1 is a longitudinal sectional view through a cylinder assembly in accordance with the invention;

Fig. 2 is a cross-section taken in the plane II—II of Fig. 1; and

Fig. 3 is a cross-section taken in the plane III—III of Fig. 1.

Referring to Fig. 1, the assembly therein disclosed comprises a cylinder 10 closed at its right end by a first head 11, and at its left end by a second head 12. The heads 11 and 12 have internal flanges 13 and 14 that fit into the ends of the cylinder 10 and are sealed with respect thereto by sealing rings 15 and 16 respectively. The heads are held against the ends of the cylinder 10 by four stay bolts 18 which are threaded into the second head 12.

The cylinder 10 contains a piston 20 to which is attached a piston rod 21 that extends through an aperture provided therefor in the first head 11, the piston rod being sealed with respect to the head by a sealing ring 22. The head 12 has a projection 23 containing an eye 24 for anchoring the cylinder to a suitable support, and the piston rod 21 is shown provided with a clevis 25 for connecting it to a device to be operated.

Fluid connections for supplying and exhausting fluid from either end of the cylinder are provided in the second head 12. Thus one port 26 in the second head 12 is connected by a passage 27 in the head, and by a valve seat passage 28, to a recess 29 in the interior of the head 12 which is in open communication with the left end of the cylinder 10.

Another port 30 in the head 12 is connected by the passage 31 in the head with the left end of a tube 32 which extends between the tube heads 12 and 11 and is sealed with respect thereto by gaskets 33 and 34. The right end of the tube 32 communicates with a passage 35 in the head 11 which is in open communication with the right end of the cylinder 10. Normally the valve passage 28 is open, so that by supplying pressure fluid to the port 26 and exhaust fluid from the port 30, the piston 20 is moved from left to right, whereas if pressure fluid is supplied to port 30 and fluid is exhausted from port 26, the piston 20 is moved from right to left.

It is desired to limit the movement of the piston 20 in leftward direction, and to this end a valve mechanism is provided which closes off the passage 28 when the piston 20 has moved into the desired leftmost position.

This valve mechanism includes a poppet valve 37 adapted to seat against a seat 38 at the inner end of the valve passage 28 and thereby close the passage. The poppet 37 is guided in its movement by two integrally formed valve stems 39 and 40 projecting in opposite directions from the poppet. The valve stem 40 projects into a bushing 41 that is positioned in a bore formed therefor in the head 12 and held in place by a split retaining ring 42. A helical compression spring 43 compressed between the poppet 37 and the inside face of the bushing 41 retains the latter in position against the retaining ring 42. The bushing 41 is sealed in its passage in the head by a sealing ring 44, and the valve stem 40 is sealed with respect to the bushing by a sealing ring 45. The valve stem 39 extends through a bore provided therefor in the head 12 into a cam chamber 47 that is formed in the head, the stem 39 being sealed by a seal 48. The cam chamber 47 is closed by a plate 49 that is vented to atmosphere as by the vent hole 50.

The cam chamber 47 contains a cam 52 that is secured to the left end of a push rod 53 that extends through an aperture provided therefor between the cam chamber 47 into the tube 32. A sealing ring 54 prevents leakage of fluid from the interior of tube 32 into the cam chamber 47. The push rod 53 extends through the tube 32, and has an enlarged right end portion 53A that extends through an aperture provided therefor in the first head 11, and projects beyond the head a short distance. A sealing ring 55 prevents leakage of fluid past the portion 53A of the push rod where it passes through the head 11.

The push rod 53 and the cam 52 are normally maintained in a rightmost position, as shown in Fig. 1, by a helical compression spring 57 that is compressed between the cam chamber closure plate 49 and the cam 52. In this position, the high portion of the cam depresses the valve stem 39 to hold the poppet 37 off of the seat 38 and permit free flow of fluid through the passage 28.

The push rod 53 is actuated to shift the cam 52 and permit the poppet valve 37 to close, by a pusher member 60 that is adjustably secured to the piston rod 21. This pusher member 60 is clamped onto the piston rod by a screw 61 and can be adjusted at any desired point along the rod by loosening the screw 61.

The operation of the device is obvious from the drawing, but it will be briefly reviewed.

Normally the poppet 37 is held open by the cam 52, as shown in Fig. 1, and the piston 20 can be moved in either direction by supplying pressure fluid to one of the ports 26 or 30, and exhausting fluid from the other port. However, as the piston 20 approaches its desired leftmost position, the pusher 60 contacts the right end of the push rod 53 and moves it to the left, compressing the spring 57 in so doing. This causes the high part of the cam 52 to ride off the end of the valve stem 39, permitting the compression spring 43 to close the poppet 37 against the seat 38. Of course during leftward movement of the piston 20, as described, fluid is being exhausted from the left end of cylinder 10 through the valve passage 28. Hence the pressure of the fluid tends to hold the poppet 37 against its seat, and the spring 43 does not have to exert a large force. When it is next desired to move the piston 20 to the right, the application of the pressure fluid to the port 26 opens the poppet 37 by virtue of the fluid pressure, which is able to overcome the spring 43 and the load on the piston 20. As the pusher 60 is carried to the right, it permits the push rod 53 to be restored by the spring 57 to normal position, in which the high portion of the cam 52 holds the stem 39 in position to maintain the poppet 37 clear of its seat 38.

The spring 57 is relatively strong as compared to the spring 43, and is able to open the poppet 37 against the force exerted by the spring 43 if the pusher 60 is moved, along with the piston 20 and piston rod 21, to the right by external force instead of by pressure fluid introduced through the port 26. Depression of the push rod 53 by the pusher 60 positively blocks fluid flow out of the left end of the cylinder 10, and thereby prevents further movement of the piston 20 to the left, even though great force is applied from an external source to the piston rod 21. However, the system does not prevent subsequent movement of the piston to the right when such movement is desired.

The spring 43 need only have enough strength to overcome the friction of the packing rings 45 and 48.

Since the push rod 53 does not apply force to the poppet 37 to close it directly, but, instead, simply moves the cam 52 out of the way of the valve stem 39 to permit the spring 43 to close the poppet 37, no damage to the valve assembly can be produced by slight excess movement of the pusher 60 to the left beyond the desired stopping point. Such movement merely carries the cam 52 a little farther than it would normally move and further compresses the cam spring 57.

It will be observed that the only external moving parts on the assembly are the piston rod 21 and the projecting end of the push rod 53. Furthermore, the tube 32 not only serves as an enclosure for the rod 53 but provides a fluid connection between the two heads 11 and 12 so that both fluid ports for external connection are in the same head, and in the head that has least movement when the cylinder assembly is supported by the eye 24, which permits greater oscillatory movement of the right end of the cylinder than the left.

The right end portion 53A of rod 53 which passes through the seal 55 is made of larger diameter than the portion 53B of the rod passing through seal 54, to provide a hydraulic pressure force on the rod 53 aiding the spring 57. When the pressure in the tube 32 is low, the seals 54 and 55 offer relatively low frictional resistance to movement, which is readily overcome by the spring 57. However, if at the time the piston 20 is moved to the right, a high back pressure exists in the tube 32, the friction at the seals 54 and 55 can be quite great, and it is desirable to provide a force aiding that of the spring 57 but proportional to the pressure in the tube 32, to compensate for the additional frictional loading at the seals produced by the pressure. This pressure force is proportional to the differential area of the rod portions 53B and 53A respectively.

The valve stems 39 and 40 are of the same diameter and are both exposed to atmospheric pressure on their outer ends. Therefore the forces acting on the valve 37 are not affected by the pressure within the left end of the cylinder 10 when the valve is in open position.

Although for the purpose of explaining the invention, a particular embodiment thereof has been shown and described, obvious modifications will occur to a person skilled in the art, and I do not desire to be limited to the exact details shown and described.

I claim:

1. A hydraulic motor unit comprising: a cylinder having a first head at one end and a second head at the other end, said first head having a piston rod passage therethrough; a piston in said cylinder and a piston rod extending from said piston through said passage in said first head; said first head having a first fluid passage therein for supplying fluid to and exhausting fluid from said one end of said cylinder; said second head having a second fluid passage therein for supplying fluid to and exhausting fluid from said other end of said cylinder; said second fluid passage including a valve seat facing the cylinder end of the passage; a poppet valve slideably supported in said second head for movement into and out of closing engagement with said seat; a push rod parallel to said cylinder and having a first end extending beyond said first head and a second end adjacent said poppet valve in said second head; means in said heads for slideably supporting said push rod for longitudinal movement; a pusher member on said piston rod engageable with said first end of said push rod for shifting the push rod from its said normal position into an actuated position in response to inward movement of said piston rod into a predetermined position; means responsive to movement of said push rod from its normal to its actuated position for seating said poppet valve; and means for restoring said push rod to its said normal position in response to opening movement of said poppet valve and outward movement of said piston rod from said predetermined position.

2. A unit according to claim 1 including a tube surrounding said push rod and extending between and sealing with said heads, said first fluid passage in said first head communicating with the adjacent end of said tube; said second head having an external port communicating with the other end of said tube, and fluid sealing means in each head sealing with said push rod for preventing leakage of fluid from said tube past said rod.

3. A unit according to claim 2 in which the portion of said push rod extending through said first head is of larger diameter than the portion extending through said second head.

4. A unit according to claim 1 in which said second head defines a chamber vented to atmosphere enclosing said second end of said push rod, said poppet valve has stems projecting from opposite sides thereof, said second head has alined guide passages for said valve stems extending from said second fluid passage to said chamber and to the exterior surface of said head respectively, and fluid-sealing means sealing said stems with respect to said guide passages.

5. A unit according to claim 1 in which said poppet valve has a stem extending transversely into operative relation with said second end of said push rod, a valve stem guide passage in said second head in which said stem is reciprocable, and fluid-sealing means between said valve stem and said guide passage.

6. A unit according to claim 1 in which said means for seating said poppet valve comprises a cam on said second end of said push rod and a spring urging said poppet toward its seat.

7. A unit according to claim 6 in which said means for restoring said push rod to its said normal position comprises a spring.

CARLOS B. LIVERS.

REFERENCES CITED

The following references are of record in the file of this patent:

UNITED STATES PATENTS

| Number | Name | Date |
|---|---|---|
| 2,383,689 | Silver | Aug. 28, 1945 |
| 2,509,589 | Deardorff | May 30, 1950 |